Figure 1:
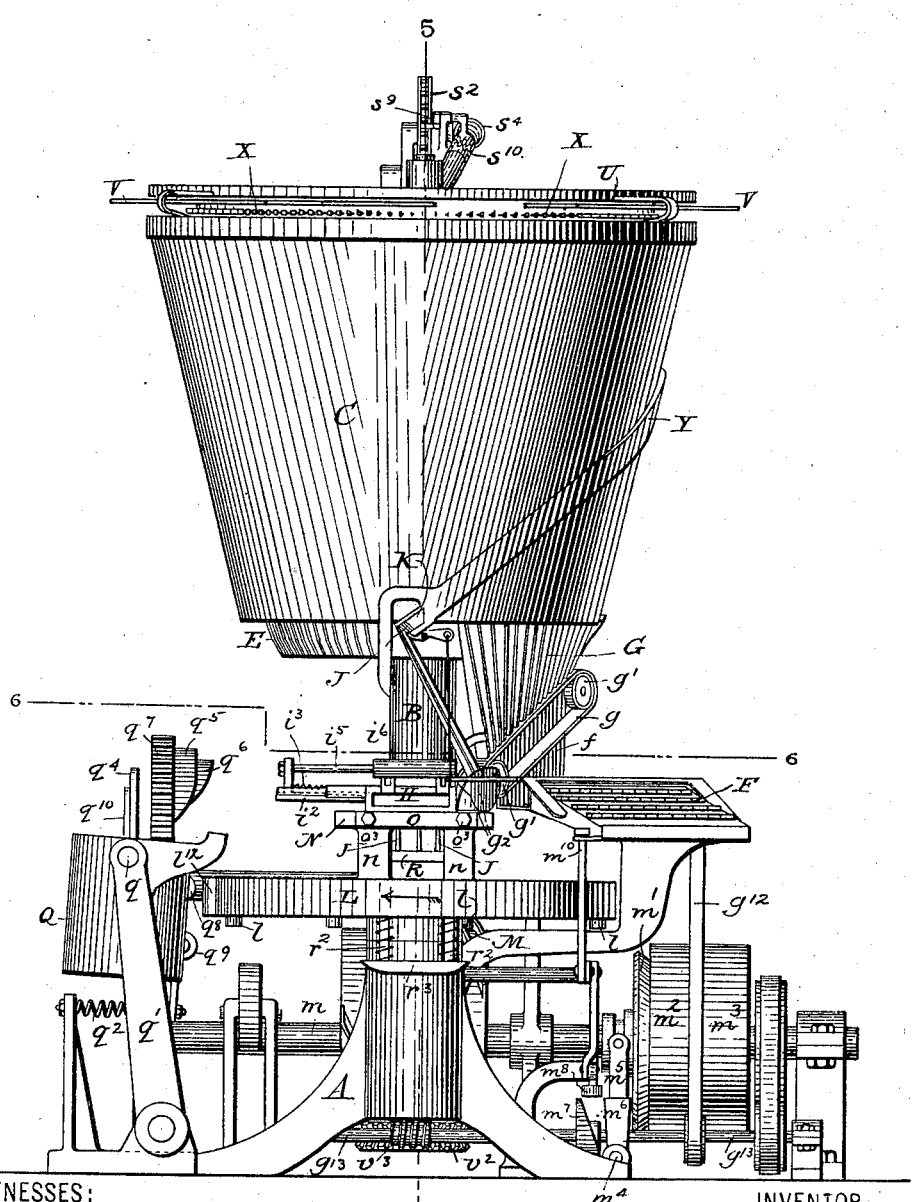

No. 638,866. Patented Dec. 12, 1899.
F. C. DAMM.
LINOTYPE MACHINE.
(Application filed July 25, 1899.)
(No Model.) 9 Sheets—Sheet 1.

WITNESSES:
F. S. Elmore.
A. M. E. Kennedy.

INVENTOR
F. C. Damm
BY
Phil T. Dodge
ATTORNEYS

No. 638,866. Patented Dec. 12, 1899.
F. C. DAMM.
LINOTYPE MACHINE.
(Application filed July 25, 1899.)
(No Model.) 9 Sheets—Sheet 3.

WITNESSES:
INVENTOR
F. C. Damm.
BY
Phil. T. Dodge
ATTORNEY

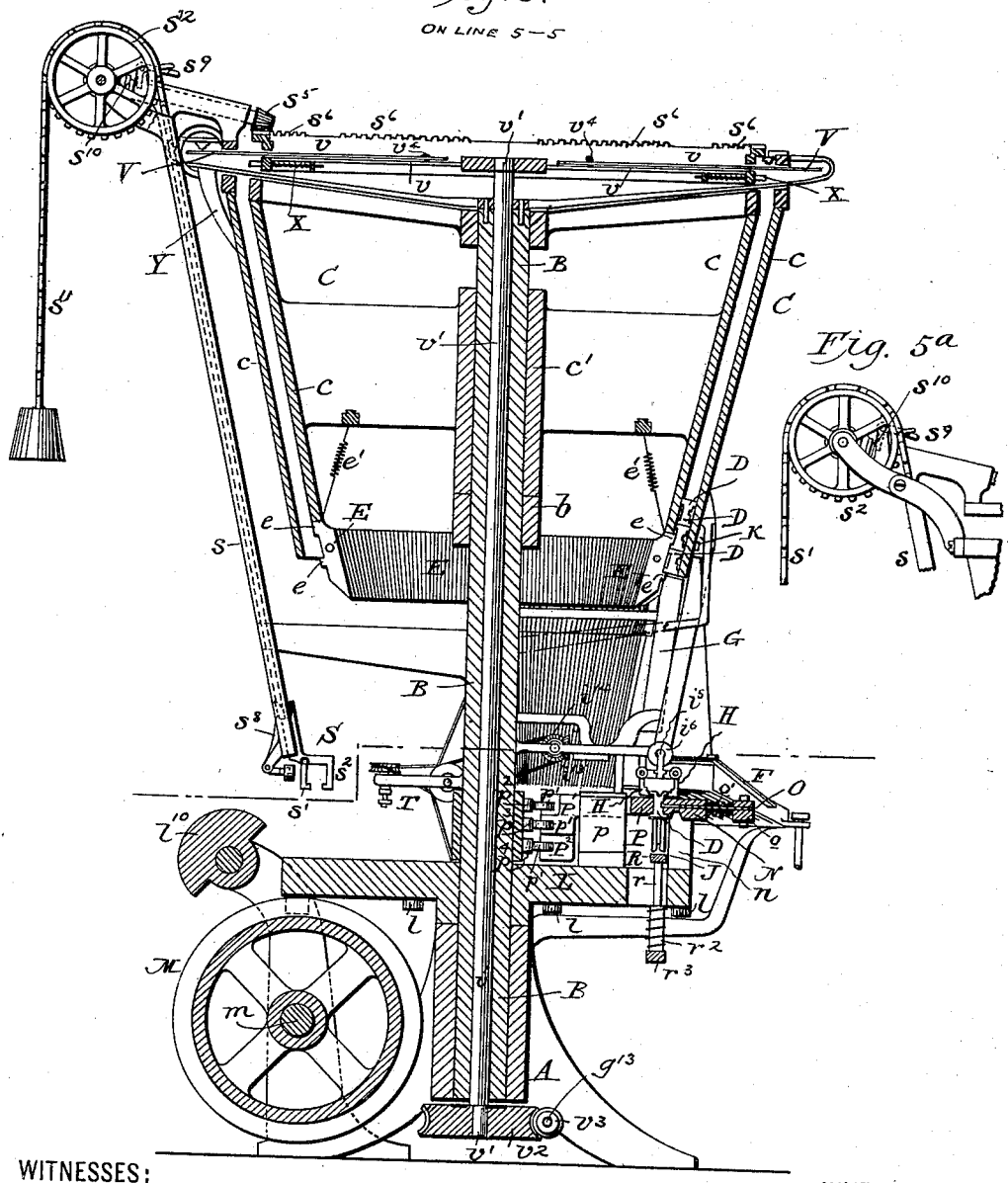

No. 638,866. Patented Dec. 12, 1899.
F. C. DAMM.
LINOTYPE MACHINE.
(Application filed July 25, 1899.)
(No Model.) 9 Sheets—Sheet 5.
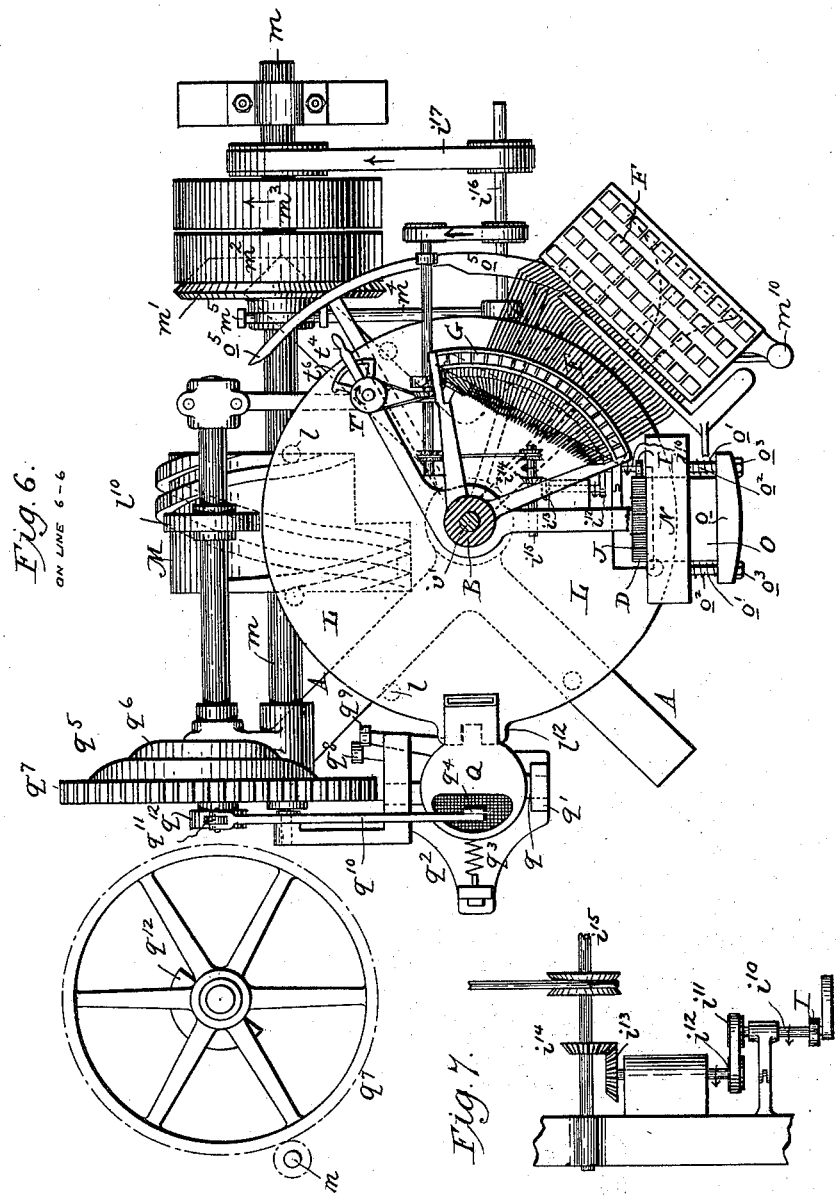

No. 638,866. Patented Dec. 12, 1899.
F. C. DAMM.
LINOTYPE MACHINE.
(Application filed July 25, 1899.)
(No Model.) 9 Sheets—Sheet 6.
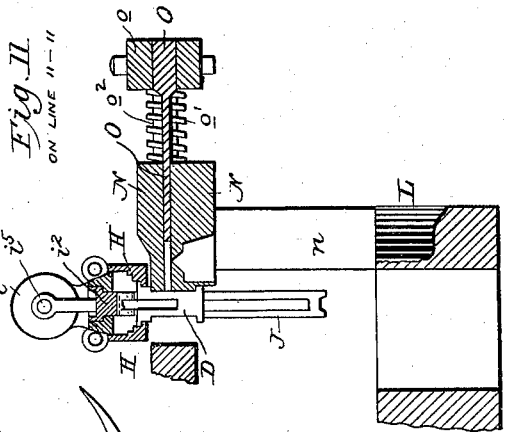
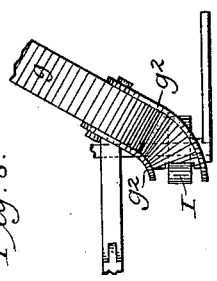
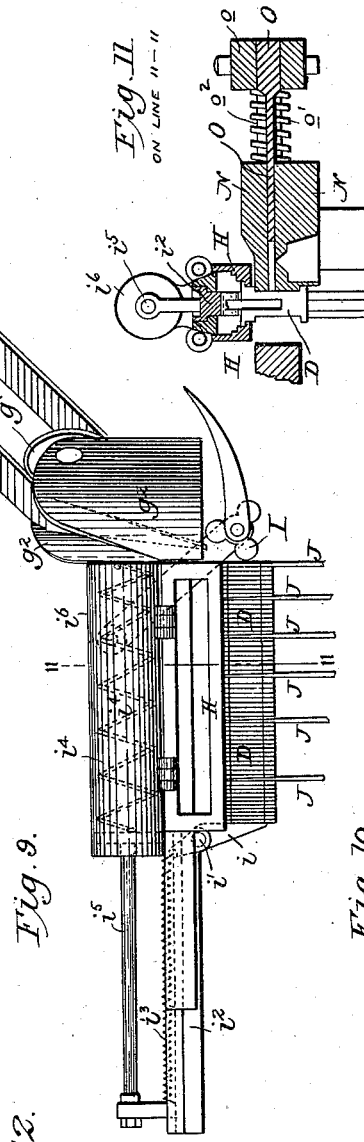
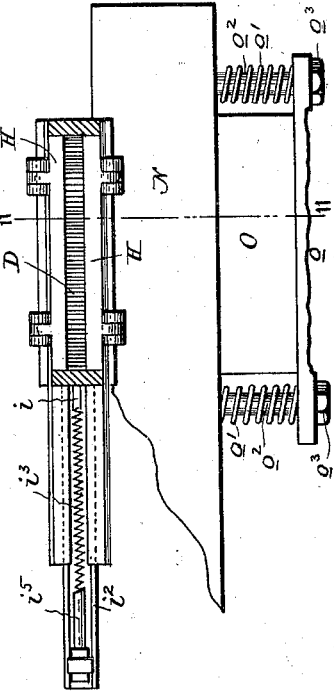
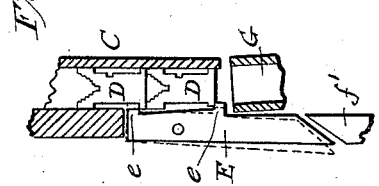
WITNESSES:
INVENTOR
F. C. Damm
BY
Phil. T. Dodge
ATTORNEY No. 638,866. Patented Dec. 12, 1899.
F. C. DAMM.
LINOTYPE MACHINE.
(Application filed July 25, 1899.)
(No Model.) 9 Sheets—Sheet 7.
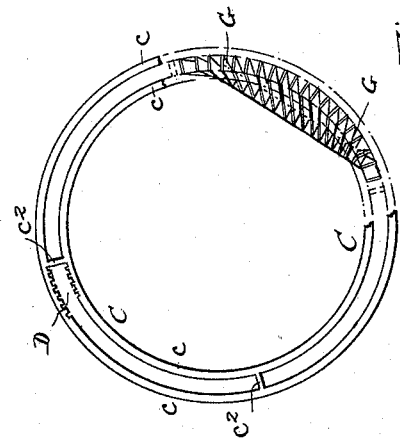
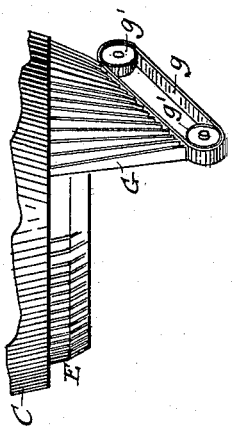
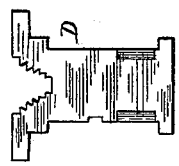
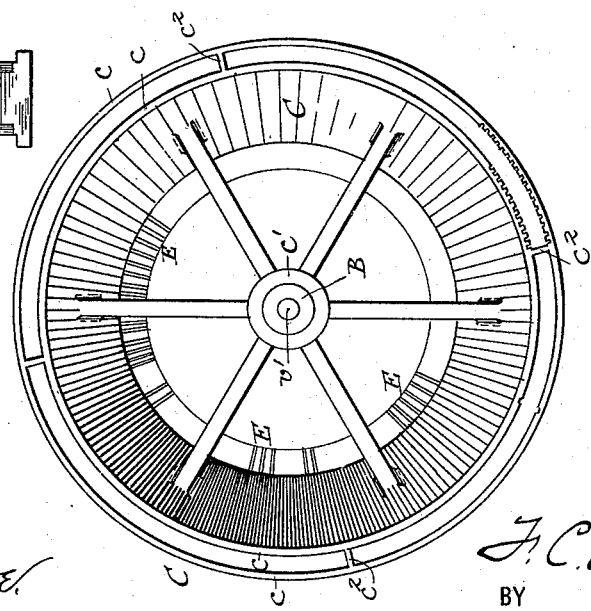
WITNESSES:
INVENTOR
BY
ATTORNEY No. 638,866. Patented Dec. 12, 1899.
F. C. DAMM.
LINOTYPE MACHINE.
(Application filed July 25, 1899.)
(No Model.) 9 Sheets—Sheet 8.
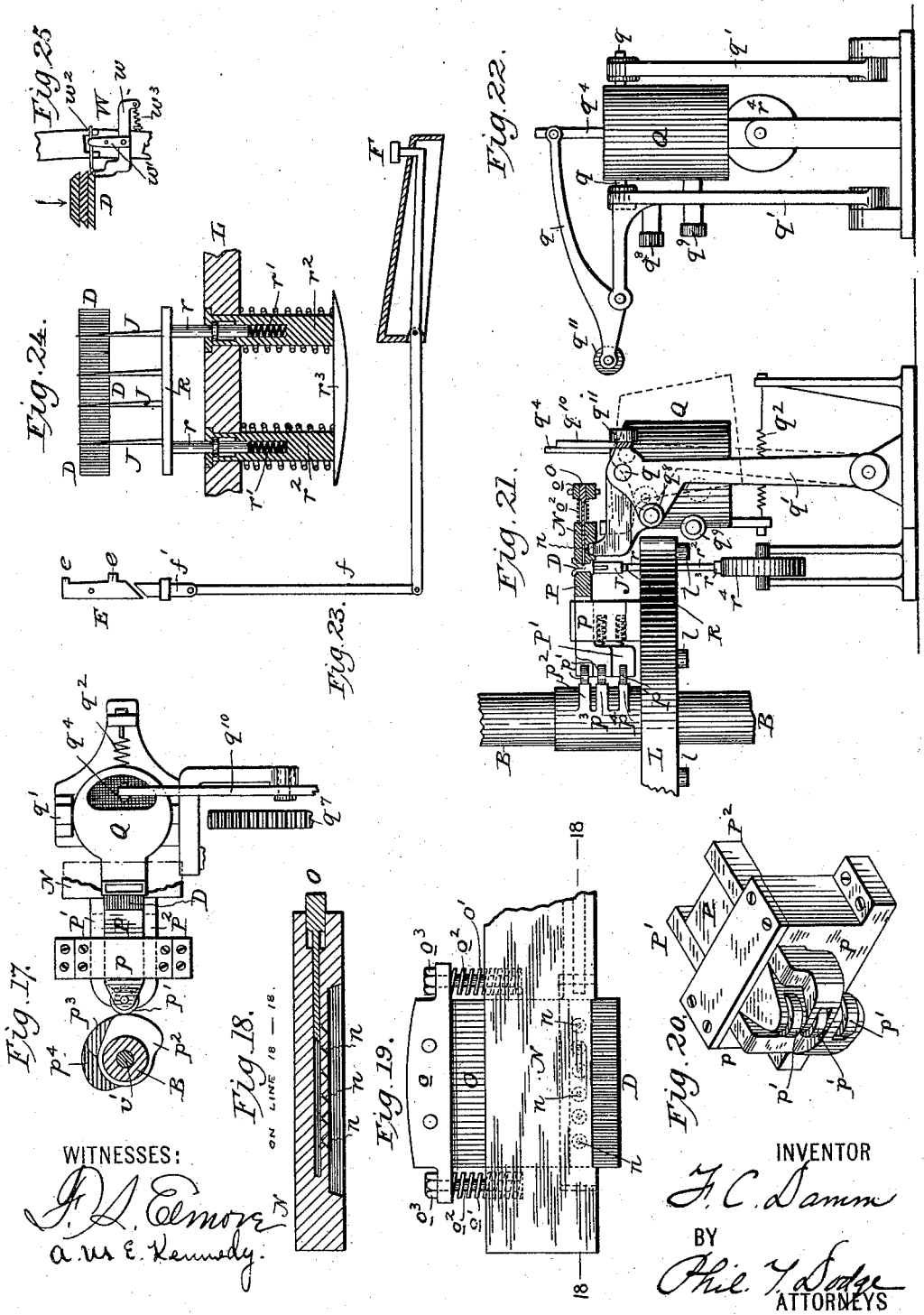
WITNESSES:
INVENTOR
F. C. Damm
BY
Phil. T. Dodge
ATTORNEYS

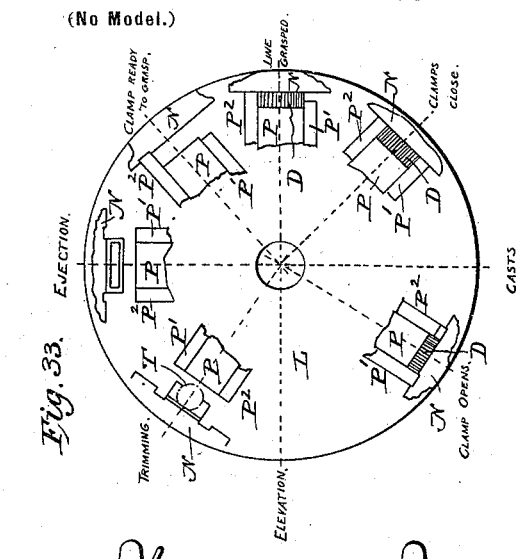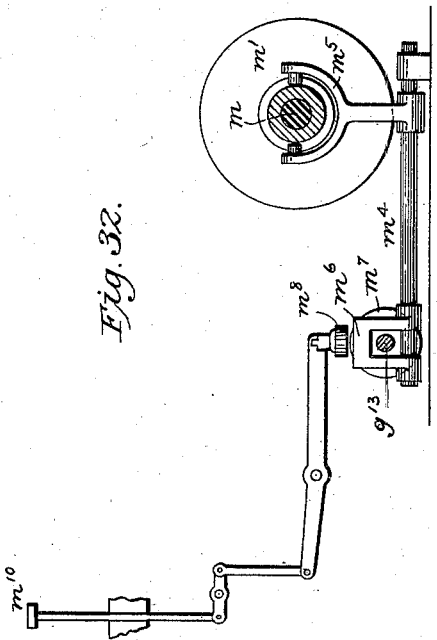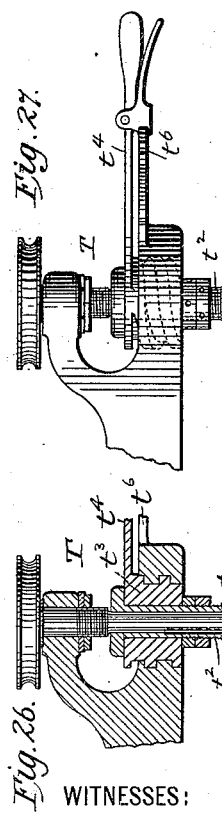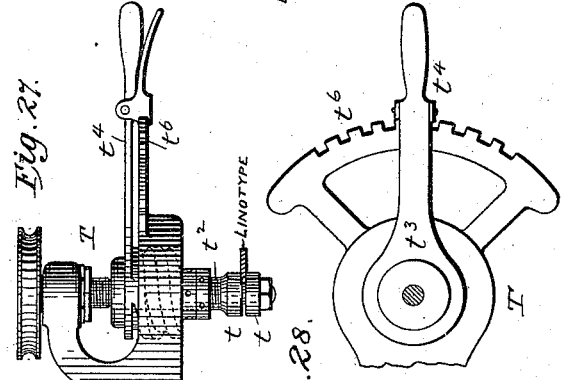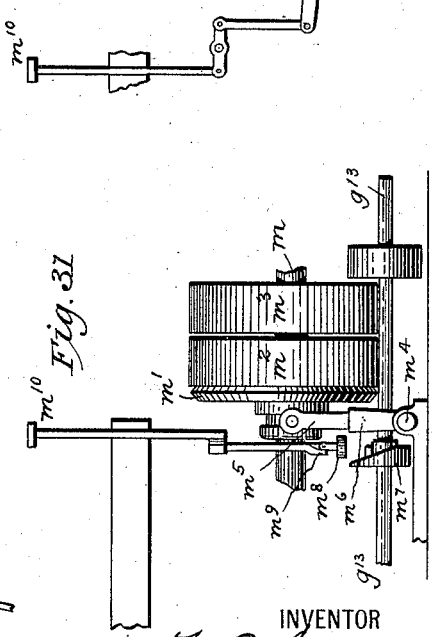

UNITED STATES PATENT OFFICE.

FREDRICH C. DAMM, OF NEW YORK, N. Y., ASSIGNOR TO THE MERGENTHALER LINOTYPE COMPANY, OF NEW YORK.

LINOTYPE-MACHINE.

SPECIFICATION forming part of Letters Patent No. 638,866, dated December 12, 1899.

Application filed July 25, 1899. Serial No. 725,078. (No model.)

*To all whom it may concern:*

Be it known that I, FREDRICH C. DAMM, formerly of Seattle, Washington, now residing in New York, (Brooklyn,) county of Kings, and State of New York, have invented a new and useful Improvement in Linotype - Machines, of which the following is a specification.

My invention has reference to linotype-machines in which small metal matrices containing individual characters are stored in a magazine, selected and assembled temporarily in justified lines in the order in which the characters are to appear in print, the justified lines presented to a mold in order to produce the type characters in relief on the edge of a slug or linotype cast in said mold, and, finally, the matrices returned to the magazine from which they started.

The objects of my invention are mainly to simplify the construction of such machines and to adapt them to carry several series or sets of matrices for different styles or sizes of type, so that one set or another may be brought into action at will.

With these ends in view I employ an upright magazine of circular form having a series of channels or passages to contain the matrices, these passages being sufficient in number to carry several sets or series of matrices and the magazine being so mounted that it may be revolved at will and fixed in position to present one series of channels or another in operative relation to the assembling or composing mechanism. In connection with the magazine I employ a series of escapement devices carried thereby at its lower end for the purpose of discharging the matrices one at a time, and in connection with these escapements I employ a stationary keyboard and connections therefrom for operating the escapements of those magazine-channels which are for the time being in operative position and means for receiving the discharged matrices and assembling them in line, together with suitable spaces to effect justification. I also employ below the parts above named a revolving table carrying a sectional mold and clamping devices adapted to receive the composed lines of matrices and carry them forward first into operative relation to a pot for supplying molten metal and thereafter to devices for lifting the matrices to the distributing mechanism, this table being also provided with ejecting mechanism for delivering the slug or linotype from the mold.

I provide elevating devices for lifting the line of matrices after the casting operation to the distributing mechanism at the upper end of the magazine.

For the purpose of distributing the matrices I employ a stationary rail curved to follow the upper end of the magazine, this rail being provided with longitudinal teeth permuted in their arrangement to correspond with teeth in the upper ends of the matrices after the manner practiced in the commercial linotype of the present day. I also employ in this connection revolving carriers, whereby the matrices are separated and advanced successively along the distributer-rail until they reach the points at which their teeth permit them to fall into the magazine-channels below.

Figure 2:
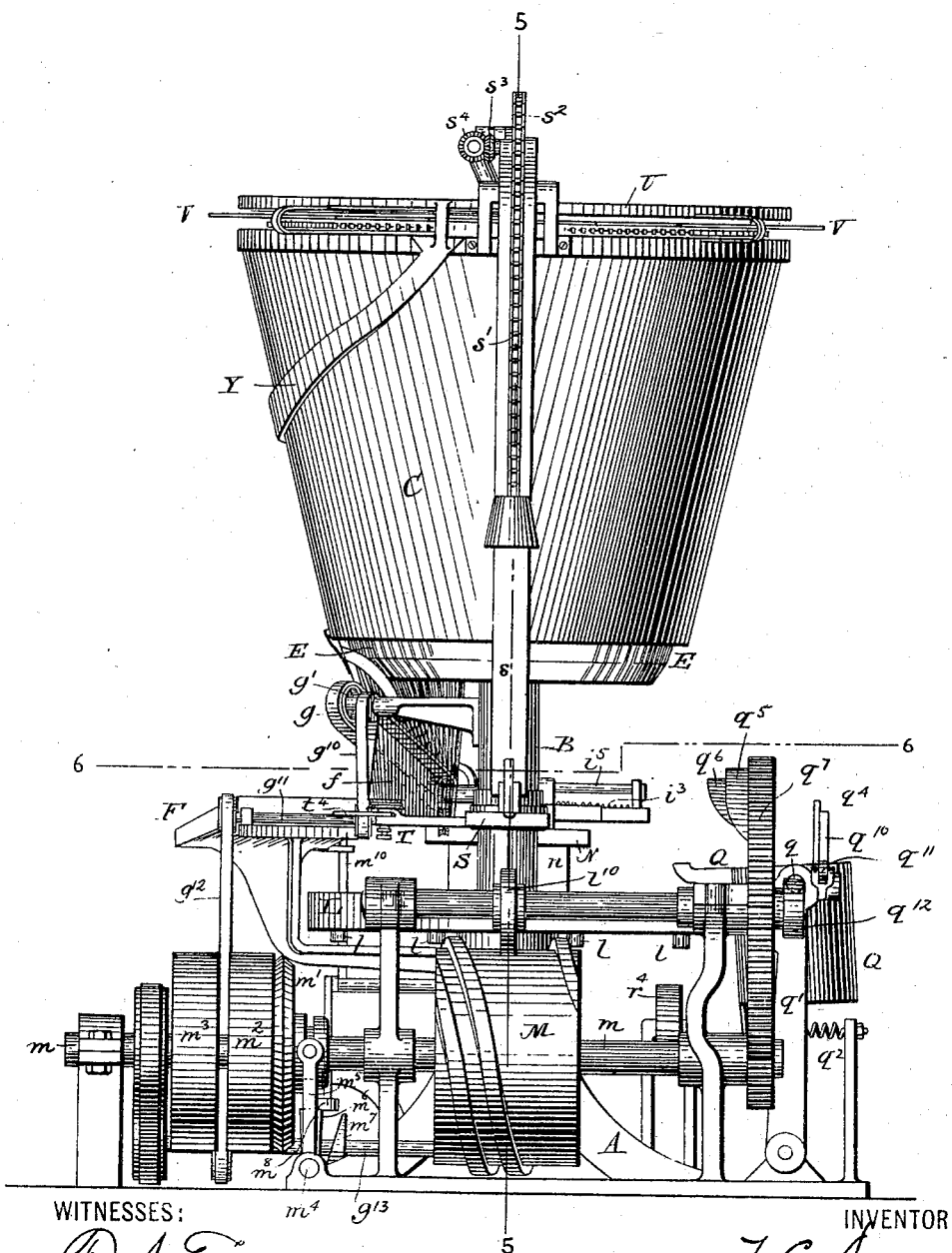
Figure 3:
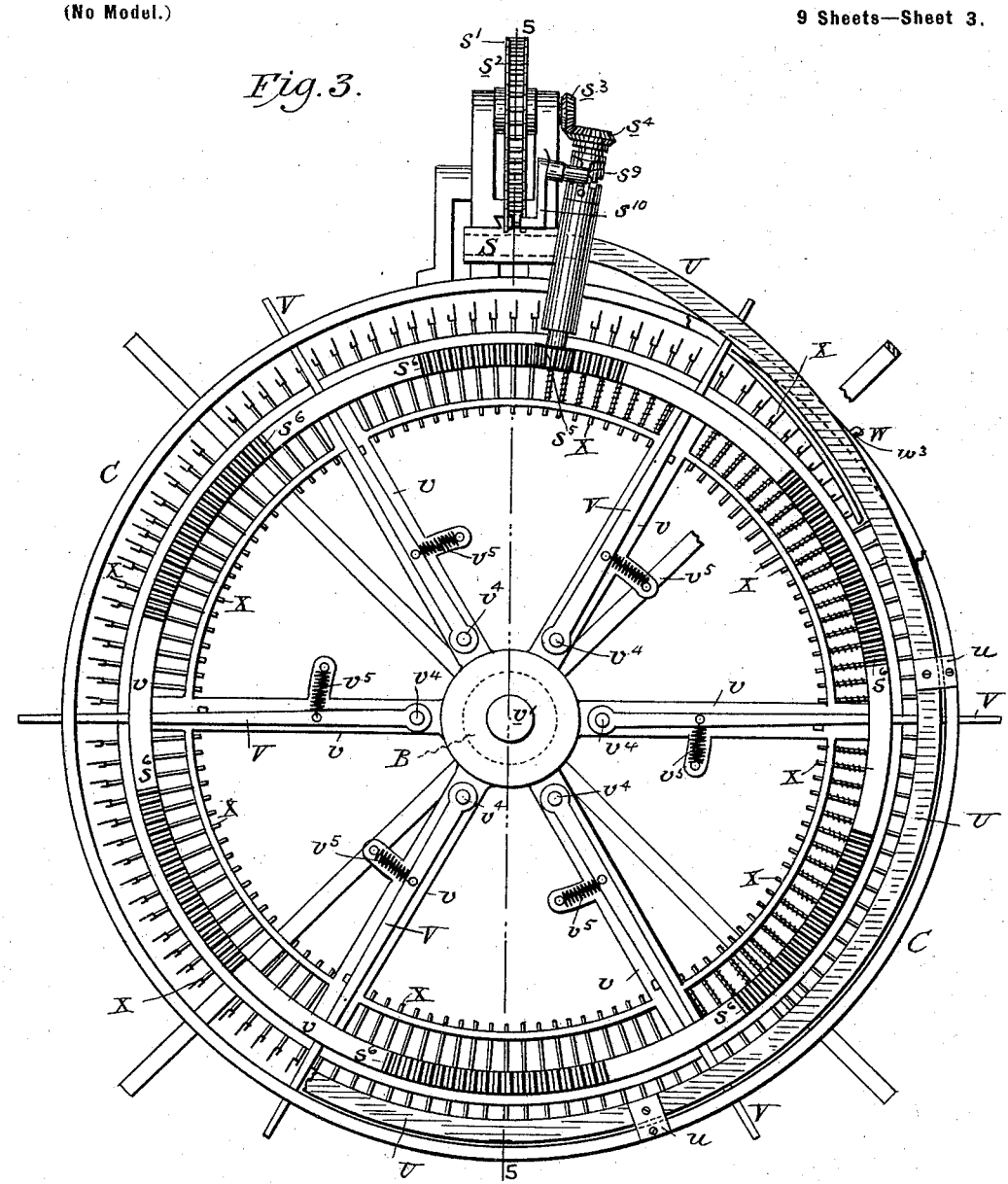
Figure 4:
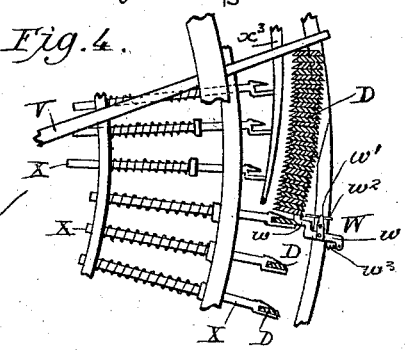

Referring to the accompanying drawings, Figure 1 is a front elevation of my machine. Fig. 2 is a rear elevation of the same. Fig. 3 is a top plan view illustrating more particularly the form of the magazine and the distributing mechanism. Fig. 4 is a plan view, on a larger scale, showing the details of the matrix-feeding devices. Fig. 5 is a vertical cross-section of the machine from front to rear on the line 5 5 of Figs. 1, 2, and 3. Fig. 5ª is a side elevation of the upper part of the mechanism for lifting the lines of matrices to the level of the distributer. Fig. 6 is a horizontal section on the line 6 6 of Figs. 1, 2, and 5 looking in a downward direction. Fig. 7 is a plan view showing details of the driving mechanism. Fig. 8 is a plan view showing a portion of the assembling devices. Fig. 9 is a front elevation of the assembling devices by which the matrices descending from the magazine are assembled in line. Fig. 10 is a top plan view of the same. Fig. 11 is a cross-section on the correspondingly-numbered line of the preceding figure. Fig. 12 is a vertical section through one of the magazine-channels and the escapement device at its foot. Fig. 13 is a top plan view of the magazine. Fig. 14 is a plan view showing the lower end of the magazine and the relation of the magazine-channels to the matrix-guides thereunder. Fig. 15 is a side elevation of the parts shown in the preceding figure. Fig. 16 is a side view of one of the matrices. Fig. 17 is a top plan view of the casting-pot, a portion of the mold, and adjacent parts. Fig. 18 is a longitudinal vertical section through the mold in which the linotypes are formed on the correspondingly-numbered line of Fig. 19. Fig. 19 is a top plan view of the mold. Fig. 20 is a perspective view of the devices for clamping the matrix-line against the front of the mold. Fig. 21 is a side elevation showing the melting-pot, mold, matrix-clamping devices, justifying devices, and other parts shown in Fig. 17, the mold and ejector being shown in vertical section. Fig. 22 is an elevation of the parts illustrated in the preceding figure looking from the outer part toward the center or body of the machine. Fig. 23 is an outline elevation showing one of the escapements for releasing matrices from the magazine and the finger-key connections for operating the same. Fig. 24 is a side elevation, partly in section, showing the devices for driving the justifying-wedges upward through the matrix-line. Fig. 25 is a top plan view showing on a large scale the means for separating the matrices as they pass upon the distributer-rail. Figs. 26 and 27 are respectively a vertical section and a side elevation of the means for trimming the slugs or linotypes to the proper thickness. Fig. 28 is a top plan view of the same. Fig. 29 is a side elevation of the spacing, holding, and discharging mechanism. Fig. 30 is an end elevation of the same. Figs. 31 and 32, respectively, are a side elevation and an end elevation of the main driving-shaft and adjacent parts for throwing the machine out of action. Fig. 33 is a diagrammatic plan view illustrating more particularly the position of the matrix-line and adjacent parts during the different periods in the operation of the machine.

Referring to the drawings, A represents a rigid base-frame, which may be of the form shown or of any other suitable form adapted to sustain the operative parts hereinafter described.

B is a vertical tubular shaft or post fixed rigidly in the base-frame and rising therefrom to give support to the magazine C and other parts, as hereinafter explained.

The magazine C is preferably constructed, as shown, in the form of a hollow truncated cone with its base uppermost; but it may be made of cylindrical form, if preferred. This magazine consists of inner and outer parallel walls or plates $c$, having in their proximate or inner faces a series of vertical grooves or channels to receive and guide the edges of the matrices D, as shown in Figs. 5, 13, and 14, which, being dropped into the upper ends of the grooves by the distributer, as hereinafter explained, are held in vertical columns, one matrix resting on top of another, as shown in Fig. 5, each column containing matrices which bear the same character.

The magazine is constructed with arms or spokes extending inward to a central supporting hub or sleeve $c'$, mounted upon and around the central shaft B and sustained thereon by a collar or shoulder $b$, as seen in Fig. 5, so that the magazine as a whole, although standing normally at rest, may be revolved around the central shaft at the will of the operator in order to bring one set of matrices or another over the assembling devices hereinafter described.

The inner and outer walls of the magazine are connected by intermediate ribs or distance-pieces $c^2$. (Clearly shown in Figs. 13 and 14.) The magazine is constructed with a sufficient number of vertical grooves to receive several sets or series of matrices—in other words, the matrices representing a number of alphabets—so that the magazine may carry at one time complete sets or series of matrices for producing two, three, or more sizes or styles of type characters.

At the lower inner edge of the magazine I mount at the foot of each matrix groove or channel an escapement E for releasing the matrices one at a time. This escapement consists of a centrally-pivoted lever having two projections $e$ above and below its pivot, so that when vibrated it will have the effect of releasing the matrices one at a time. To each escapement is connected at the upper end a spring $e'$, extending inward and attached to the frame of the magazine, so that it holds the escapement normally in position for the lower shoulder or lip $e$ to engage under and sustain the lowermost matrix in the column. The manner in which these escapements are vibrated to discharge the matrices is clearly shown in Figs. 5 and 23. A series of finger-keys F, representing the various characters in a font, are pivoted to the front of the machine and extended rearward beyond their pivots and connected at their inner ends by links $f$ to slides $f'$, vertically guided in the frame and having their upper ends beveled to act on the correspondingly-beveled ends of the escapements E. When, therefore, the front end of the finger-key is depressed, its rear end causes the slide $f'$ to move the escapement and release a matrix, which falls out of the magazine. As soon as the finger-key is released the parts assume their original position and the next matrix in the magazine descends and takes the place of the one discharged.

The number and arrangement of the finger-keys are such that they serve to operate the escapements of magazine-channels containing an entire font or set of matrices.

When the magazine is rotated by hand, as before referred to, one set of escapements is carried away from the actuating-slides $f'$ and another series of escapements, controlling a second set of matrices, is brought into operative relation to the slides. Thus it will be seen that the one keyboard with a single series of finger-keys serves to actuate one set of escapements or another and to release matrices of one set or another, according to the position to which the magazine may be turned.

As there is nothing in the operation of the parts to turn the magazine, it will remain in the position in which it may be placed; but it will of course be understood that a latch or locking device of any appropriate character may be used to prevent its accidental rotation.

As the matrices are discharged from the magazine at different points, provision must be made for receiving them and composing or arranging them in line. For this purpose I provide the stationary guide or channel G, fixed in position on the frame and arranged to deliver the matrices to an inclined traveling belt $g$, sustained at its upper and lower ends by pulleys $g'$, so that the matrices received upon this belt are carried downward and delivered one after another to the assembling devices, by which they are received and arranged in line in essentially the same manner as in the Mergenthaler machine. The matrices arriving at the lower end of the belt pass between horizontally-curved guide-plates $g^2$, (see Figs. 8 and 9,) and, continuing their downward course, they enter between two parallel sustaining-plates H, from and between which the matrices are suspended in line, as shown in Figs. 9, 10, and 11, the plates engaging the ears formed on the upper ends of the matrices, as shown in Figs. 11 and 16. These matrices, it will be observed, having ears projecting edgewise at both the upper and lower ends, are essentially the same as those used in the ordinary linotype. As the matrices descend one after another between the receiving-plates they are acted upon by the vertically-revolving wheel I, which pushes them forward one after another, thus forming a space for the entrance of the successive matrices and at the same time keeping the composed line in close order and pushing it forward to the left. The advance of the line is opposed by a yielding resistant consisting of a finger $i$, pivoted at $i'$ to a horizontal slide $i^2$, held normally in operative position by spring $i^3$, attached to its upper end. The advance of the slide carrying the resistant is resisted by a spring $i^4$, attached at one end to a piston or plunger $i^5$, mounted to move to and fro in a horizontal dash-pot or cylinder $i^6$, so that after the matrix-line has been released the spring will move the slide and detent to the right in such position that the detent may coöperate with the next line composed. The piston and cylinder serve to check the speed of the parts and prevent the detent from returning too violently to its original position.

During the composition of the line it is necessary to introduce between the words—that is, between the matrices representing the last character of one word and the first character of the next—adjustable spaces, so that the line may be justified or elongated to a predetermined limit after all the matrices possible have been added. I make use of spaces consisting of a long and a short wedge reversely arranged and dovetailed together, so that after the space has been inserted in the line its thickness may be increased at the operative point by advancing the long wedge through the line past its companion in the manner described in the Mergenthaler patent, No. 345,525. These spaces J are stored in a magazine K on the outside of the main magazine, as shown in Figs. 1, 29, and 30, the position of the magazine being such that when the foremost space is released it will descend into the holder or receiver immediately behind the last matrix in the line.

The magazine for the spaces consists, as shown in Figs. 29 and 30, of inclined top rails $k'$ and a similar pair of bottom rails $k^2$, the spaces being supported vertically between the two pairs of rails, with the ears at their upper ends resting on the upper rails, as plainly shown in Fig. 30. The escape of the spaces is prevented by ears or lips at the lower ends of the upper rails. Their release is effected by means of a centrally-pivoted lifting-lever $k^3$, connected at one end by a wire $k^4$ with a finger-key and arranged to act at the opposite end with a lifting effect on the lower end of the foremost space, so that when the space is thus lifted its upper end will pass clear of the ears on the rails $k'$, whereupon the space is free to pass downward from the rails to the matrix-line below. After the line of matrices and spaces has been formed as above described it must be brought into operative relation to the mold and clamped firmly into position against the same and the parts thereafter presented to the melting-pot in order that the mold may be filled with the metal to form the slug or linotype. These results are accomplished by the means shown more particularly in Fig. 1 and Figs. 18 to 22, inclusive.

L represents a horizontal bed or table arranged to revolve intermittingly around the vertical shaft B, motion being communicated thereto by studs $l$ on its under side engaging threads on the surface of a wheel or drum M, mounted on a horizontal shaft $m$ in the main frame.

N represents the horizontally-slotted mold in which the slug or linotype is formed. It is fixed rigidly in position on a post or standard $n$, rising from the table, so that the rotation of the table carries the mold in a circular path. The mold, as shown in Figs. 5, 11, 18, and 19, is in the form of a plate or block having a horizontal slot therethrough from front to rear of size corresponding to the body of the linotypes to be produced. The front of the mold-slot being the side nearest to the center of the table is made open, as shown in Fig. 11, and of such form as to fit snugly against the edges of the matrices between their upper and lower ears, so that when the line of matrices is presented against the mold, as shown in Figs. 11, 21, &c., it will be closed thereby and the characters and matrices proper will stand in position to form the type characters in relief on the edge of the linotype cast in the mold, as is usual in linotype-machines.

The rear end of the mold-slot, against which the base of the linotype is cast, is formed by the ejector-blade O, which is arranged to move forward and backward, being first retracted to and held in the position shown in Figs. 11, 21, &c., during the casting operation and thereafter advanced in due time to force the linotype out of the front of the mold. The blade is attached at its outer end to a head or plate $o$ and is pushed normally backward by spiral springs $o'$, encircling fixed rods $o^2$, the outer ends of which are provided with adjustable nuts $o^3$, which serve to limit the retreat of the plate, and thus to limit the depth of the mold-slot and the height of the linotype or slug produced therein.

The advance of the ejector-blade to expel the slug is effected by a stationary rail or cam $o^5$, (see Fig. 6,) connected to the main frame and having its inner curved surface formed with two steps or portions at different distances from the center of rotation. As the rotation of the table carries the ejector-head along the inside of the rail $o^5$ it first acts to advance the ejector slightly in order that its forward edge may be projected beyond the mold, subject to the action of the trimming devices hereinafter described, after which the second portion of the rail acts to advance the blade until the slug or linotype is wholly ejected from the mold and permitted to fall therefrom into a galley or other receiver.

Previous to the casting operation it is necessary that the matrices in the line shall be forced edgewise tightly against the mold and also that the line shall be clamped endwise and kept within the predetermined length when the justifying wedges or spaces are actuated. This clamping action is effected by devices separately shown in Fig. 20 and also shown in Figs. 5, 11, 17, 21, and 33, in which P represents a horizontal slide or pressure device to act against the rear edges of the matrices and force them toward the mold, and P' and P², respectively, horizontal slides which advance on the slide P past the ends of the matrix-line in order to confine the line endwise. These three slides are mounted in a support $p$, fixed to the revolving table. They stand directly opposite the mold and are each provided in the rear end with a roller $p'$. These rollers are acted upon, respectively, at the proper time by cams $p^2$, $p^3$, and $p^4$, fixed on the vertical shaft B, as clearly shown in Figs. 5, 17, and 21, which serve to push the slides forward successively, their return being effected by springs. As the revolution of the table brings the mold and clamping devices forward from the left toward the newly-composed line of matrices suspended between the plates or rails H the slides P and P' are drawn back from the mold, as shown in Fig. 33, so that as these parts continue their advance the matrices will pass between the mold N on one side and the slide P on the other until the slide P² at the rear encounters the matrix-line, when it acts to push the line forward to the left out of the holding plates or rails H. As soon as the parts have advanced sufficiently in their circular path the slide P' moves forward in front of the matrix-line, which at this period is clamped or confined in one direction between the slide P and the mold N and in the opposite direction between the slides P' and P², the slide P in the meantime advancing until the matrices are forced tightly against the mold. While thus confined the matrix-line is carried forward by the rotation of the table until the mold reaches the casting position directly over the mouth of the melting-pot Q, when the movement of the table is arrested. This pot Q is mounted on a trunnion $q$ in the upper ends of swinging standards $q'$, mounted on horizontal pivots at their lower ends. A spring $q^2$, connected to the lower end of the pot, tends to draw it backward or outward and also to tip its delivery-mouth downward away from the mold, which passes thereover. The pot is of essentially the same construction as those ordinarily used in linotype-machines, having a mouth or spout through which the metal is delivered and an internal pump-plunger $q^4$ to effect the delivery of the metal. The mouth instead of being arranged to deliver horizontally, as usual, is turned upward to fit into a recess in the under side of the mold and is arranged to deliver the metal vertically through openings $n$, Figs. 18, 19, and 21, in the under side of the mold. While the mold is at rest in the casting position the mouth of the pot is closed tightly into its under side and the pump-plunger actuated to fill the mold with metal and produce the linotype, which it will be observed is cast within the slot of the mold between the ejector-blade and the matrices. The movements of the pot are effected, as shown in Figs. 2, 6, 17, 21, and 22, by two cam-surfaces $q^5$ and $q^6$, carried on the side face of the vertical gear-wheel $q^7$ and arranged to engage, respectively, with rollers $q^8$ and $q^9$, attached, respectively, to the mold-supporting standard and to the melting-pot. The cam $q^5$ first swings the standard and the pot forward until the mouth of the latter is beneath the mold, after which the cam $q^6$ acts to tip the pot and force its mouth upward into the mold. After the casting action the cams release the pot, which falls back into its original position.

Before the casting action occurs the justification of the line must be effected by lifting the wedge-spacers J therethrough. This is effected, as shown in Figs. 21, 22, and 24, by the pressure-plate R, supported at its ends by rods $r$, resting on spiral springs $r'$ in vertically-movable rods $r^2$, mounted in the revolving table L and connected at their lower ends by a bar $r^3$, which is mounted on its under side and arranged to override a fixed roller $r^4$, which acts to lift the bar and through the intervening parts apply an upward pressure to the plate R, which forces the spacers upward through the line immediately before the operation of the metal-delivering pump. The pump-plunger $q^4$ is actuated, as shown in Figs. 2, 17, 21, and 22, by a lever $q^{10}$, pivoted at an intermediate point in its length to the pot-supporting standard and provided at the outer end with a roller $q^{11}$, acted upon at the proper time by a cam $q^{12}$ on the outer end of the horizontal shaft-carrying wheel $q^7$. After the casting action and after the retreat of the pot the table continues its rotation, carrying the matrix-line forward to a lifting device S, by which the entire line, including spaces, is lifted to the top of the machine for presentation to the distributing mechanism hereinafter described. As shown in Fig. 5, this lifting device S, which slides upward and downward in guide $s$, is constructed with the two depending jaws $s'$ and $s^2$, having at their lower ends lips or flanges to underride the ears of the matrices, which are at all times exposed above the level of the mold and clamp. As the table revolves to carry the line of matrices and spaces forward into the elevator S the main clamping-slide P slowly retreats, and in due time the end slides P' and P² are also retracted, thus leaving the line of matrices in the elevator, while the mold and clamping devices continue their course. While the slides are all retracted, so as to leave an open space in front of the mold, the ejector is slightly advanced and the edge of the slug protruded beyond the face of the mold, as hereinbefore explained. While the slug is thus sustained in and carried forward by the mold its forward edge is acted upon by a rotary trimmer T, (shown in Figs. 2, 5, 6, 26, and 27,) which serves to remove those slight burs, fins, or projections which are sometimes formed between the face of the mold and the edges of the matrices when the parts are not kept clean. The trimmer consists of two milling-cutters $t$, carried by a vertical spindle and having cutting-teeth on their proximate faces, so that they will dress the opposite edges of the slug passed between them, as shown in Fig. 27. After the slug is carried beyond the trimmer the ejector-blade completes its advance and the slug or linotype falls from the machine.

As it will be a common practice to use interchangeable molds, producing slugs of different thicknesses, it is desirable to make the trimming device adjustable. To this end the lower cutter $t$ is fixed on the lower end of the spindle $t'$, mounted in bearings and secured against end motion. The upper cutter is mounted on a sleeve $t^2$, surrounding the spindle $t'$ and connected thereto by a spline or feather. This sleeve $t^2$ revolves in and is fixed against end motion in a supporting-box $t^3$, having an external screw-thread seated in the main frame, so that the rotation of this box serves to raise and lower the sleeve $t^2$ and the upper cutter in relation to the lower cutter. The adjustment is effected by means of a lever $t^4$, fixed to the sleeve and provided with a latch or locking device which engages a toothed sector $t^6$.

During the casting operation and while the table is at rest it is locked firmly in position, as shown in Figs. 2, 5, and 6, by a revolving plate $l^{10}$, mounted on a horizontal shaft and arranged to enter a notch-gear on the side of table shown at $l^{12}$, Fig. 6.

The distributing mechanism, located at the upper end of the magazine, is shown in Figs. 1, 2, 3, 4, 5, and 25. The matrices (shown in Fig. 16) are each constructed at the upper end with a notch or indentation, having in the edges teeth by means of which the matrices are suspended while traveling along a distributer-bar of corresponding form. The teeth of matrices bearing a given character or letter are alike in number and arrangement; but the teeth are varied in number or arrangement, or both, for matrices bearing different characters, and the teeth of the distributer-bar are correspondingly varied at different points in its length, so that each matrix will be suspended by its teeth in the course of its travel until it reaches a point directly over its appropriate channel in the magazine, at which point its teeth will bear such relation to those of the bar that it is permitted to escape and fall into the magazine. This construction of the matrices and the distributer-bar may be in all respects identical with those set out in the Mergenthaler patent, No. 347,629, dated August 17, 1886, except that in the present instance the distributer-bar, instead of being straight, is curved in a circular path to correspond with the form of the magazine.

U represents the fixed distributer-rail, supported on the top of the magazine and of sufficient length to cover one section of the magazine—that is to say, the portion of the magazine containing one set or series of matrices. The matrices of the different sets are alike as to their combinations of distributing-teeth, so that the matrices in use will be delivered into that particular section of the magazine which stands for the time being under the rail. It will be understood that the turning of the magazine which brings one set or another of matrices into action also brings the channels containing them under and in operative relation to the distributer-rail. Thus the one rail is made to distribute at different times different sets of matrices into their appropriate portions or sections of the magazine.

It will be observed that the distributer-rail is carried outward eccentrically at its receiving end, so that when the line of matrices and spaces is lifted by the elevator S, before referred to, the line will stand adjacent to the end of the rail and in such position that when moved laterally the teeth of the matrices will engage the teeth of the rail in order that they may hang therefrom. For the purpose of thus carrying the line out of the elevator onto the rail I provide a series of horizontally-revolving arms V, pivoted to a skeleton plate $v$ on the upper end of a central shaft $v'$, which extends downward through the main shaft B of the machine, its lower end being provided with a worm-wheel $v^2$, receiving motion from a worm $v^3$. The arms V, as shown in Fig. 3, are pivoted at $v^4$ and connected to the springs $v^5$, which tend to draw them forward, so that in the course of their revolution they act successively against the matrices in the elevator S, carrying them forward out of the elevator to the distributer-rail and urging the line forward in compact form along the rail.

In order to insure the delivery of the matrices from the rail at the proper points and to prevent them from clinging together, it is desirable to separate them before they pass upon the distributing portion of the rail and to keep them separated as they advance. To this end I adopt the construction shown more particularly in Figs. 2, 3, 4, 5, and 25, in which W represents an escapement device or stop located beneath the distributer-rail in position to encounter the foremost matrix of the line, so as to prevent the line as a whole from advancing farther. This escapement consists, as shown in Fig. 25, of a horizontal stop-finger $w$, arranged to slide inward and outward and connected through an intermediate lever $w'$ with a second stop-finger $w^2$, also arranged to slide inward and outward. A spring $w^3$ holds the finger $w$ normally in an inward position to arrest the foremost matrix in the line, while the second finger $w^2$ is retracted and stands in position to advance in front of the next succeeding matrix. When the finger $w$ is pushed forward to release the foremost matrix, the finger $w^2$ advances and in turn checks the advance of the line. Thus it will be seen that the alternating movement of the two fingers serves to release the matrices one after another from the end of the line, the line being, however, urged forward and held in compact order by the pressure of the following arm V.

For the purpose of actuating the escapement and moving the released matrix forward along the distributer I mount in the revolving plate or frame $v$, before mentioned, a series of radially-sliding carrier-fingers X, each having a shank surrounded and urged outward by a spiral spring. Each of these fingers is notched or slotted at the outer end in order to embrace a single matrix. As the fingers are moved forward by the rotation of the carrier-frame their outer ends ride against the inside of a stationary rail $x^3$, whereby they are held backward away from the line of matrices, as clearly shown in Figs. 3 and 4. The rail $x^3$ terminates slightly in advance of the escapement W. As each finger X passes the end of the rail it is thrust outward, so as to actuate the escapement and release the forward matrix, which is at the same instant embraced by the finger, which carries it forward along the distributer to the point at which it is released by the latter.

It will be understood from the foregoing that the fingers X operate successively on the escapement, each one effecting the release of a matrix from the line and carrying the matrix forward until it is in position to fall into its appropriate channel in the magazine. As each carrier-arm V reaches the escapement device its spring $v^5$ yields and permits it to swing inward in order to pass the escapement.

The elevator S for lifting the matrices to the magazine slides upward and downward in the fixed guide $s$, being raised and lowered by a chain $s^{11}$, passing over a pulley $s^{12}$, and provided at its outer end with a counterweight sufficient to lift the elevator when the parts are released. When the elevator S is down, it is held in position by an angular latch $s^8$, pivoted thereto and engaging the guide $s$. When the table in its revolution presents the matrix-line within the elevator, it encounters the latch $s^8$ and, disengaging the same, permits the elevator to rise under the influence of the weight.

In order to effect the lowering of the elevator after the matrices have been carried therefrom to the distributer-rail, I provide the shaft of wheel $s^{12}$, as shown in Figs. 2, 3, and 5, with a beveled pinion $s^3$, engaging pinion $s^4$ on the shaft of a second pinion $s^5$, arranged to engage successively the several racks or groups of teeth $s^6$, formed on top of the continuously-revolving frame or plate $v$, heretofore referred to. The several racks are separated by untoothed surfaces, as shown. After the matrices are delivered from the elevator one of the racks engages the pinion $s^5$ and through the intermediate parts turns the wheel $s^{12}$ in a proper direction to lower the elevator S. During the periods when the blank surfaces are passing the pinion $s^5$ the elevator is permitted to remain at rest in its lowest position to receive the matrices and thereafter to ascend and deliver the matrices before the next rack comes into action. During the descent of the elevator the pinion $s^5$ and its connections may be permitted to turn in a reverse direction, or a clutch $s^9$, controlled by a lever $s^{10}$, acted upon by the rising elevator, may be used to disconnect the pinion $s^4$ for the time being. These details, which may be variously modified, are not of the substance of my invention.

The wedge-spaces carried upward with the matrix-line are constructed, as usual, without distributing-teeth, and consequently they are released as soon as they leave the elevator. Being thus released, they fall into a conducting tube or chute Y, which extends downward around the outside of the magazine or holder K, heretofore described.

Movement may be imparted to the various parts of the machine by driving mechanism of any appropriate character; but I prefer to employ the arrangement of parts represented in the drawings.

The matrix-assembling wheel I, commonly known as the "star-wheel," receives motion as shown more particularly in Figs. 6, 7, and 8, its shaft $i^{10}$ having a pulley $i^{11}$, which receives motion by belt from a pulley $i^{12}$ on a shaft carrying a beveled pinion $i^{13}$, driven from pinion $i^{14}$ on a shaft $i^{15}$, which receives motion in turn through a belt and pulleys from the shaft $i^{16}$, driven in turn by a belt $i^{17}$ and pulleys from the main shaft $m$. The shaft $i^{16}$ also communicates motion through a belt and pulleys to the vertical shaft of the trimmer T, as shown in Fig. 6.

The assembling-belt $g$, to which the matrices descend from the magazine, receives motion through its upper supporting-pulley $g'$, (see Figs. 1 and 2,) its shaft in turn carrying a pulley driven by belt $g^{10}$ from a pulley on shaft $g^{11}$, which is in turn connected through a belt $g^{12}$ and pulleys to shaft $g^{13}$ at the base of the machine, the last-named shaft being also provided, as shown in Figs. 1 and 5, with the worm $v^3$ for imparting motion to the central vertical shaft of the machine.

Power is communicated to the machine through the main shaft $m$, provided with the pulleys $m^2$ and $m^3$, the latter being constantly driven and serving, through its small side pulley and belt $i^{17}$, to communicate a constant motion to the assembling and trimming devices. The pulley $m^2$ coöperates with a friction-clutch $m'$ at its side, so that when the clutch is thrown into engagement with the pulley motion will be communicated to the shaft $m$, and thence to the large wheel M, for the purpose of giving the intermitting rotation to the table in order to effect successively the operations of taking the assembled line from the composing devices, clamping the line to the mold, presenting the mold to the melting-pot, delivering the matrix-line to the elevator, partly ejecting the slug and withdrawing the matrix-clamping devices in order to expose the slug for the action of the trimmer, presenting the edge of the slug to the trimming devices, and finally ejecting the slug from the mold.

The throwing of the clutch into action is effected, as shown in Figs. 1, 2, 6, 31, and 32, by means of a rock-shaft $m^4$, having at one end a forked arm $m^5$ to move the clutch and at the opposite end an arm $m^6$, standing adjacent to the cam-wheel $m^7$ on the shaft $g^{13}$. A vertically-movable roller $m^8$, carried by lever $m^9$, is connected with a vertically-moving finger-key $m^{10}$, so that when this key is depressed the roller $m^8$ will be lowered between the cam-wheel $m^7$ and arm $m^6$, whereupon the cam, pushing the roller laterally, will actuate the crank-arm $m^6$ and actuate the clutch, which will in due time by the rotation of the wheel $m^7$ be automatically released.

I am aware that in a type-composing machine two rows of magazine-tubes have been arranged to slide in relation to type-ejecting devices so that one row of tubes or the other could be brought in operative relation to said ejecting devices at will, and this I do not claim, my invention contemplating a magazine which is movable or reversible around the center of motion.

Having now described my invention, what I claim is—

1. In a linotype-machine, a stationary composing mechanism in combination with a magazine mounted to be turned about a center at the will of the attendant, whereby it may be caused to deliver matrices from one section or another to the composing mechanism.

2. In a linotype-machine, the combination of a stationary composing mechanism, a stationary distributing mechanism at a higher level, and an intermediate magazine, revoluble at the will of the operator in order to bring one portion or another of its body into operative relation with the distributer and the composing devices.

3. In a linotype-machine, the combination of an upright circular magazine, stationary when in action and revoluble about a vertical axis at the will of the operator, escapement devices carried at the lower ends of the magazine-channels, and a composing mechanism underlying the magazine and adapted to receive matrices from a portion only of the magazine-channels, whereby one portion of the magazine may be brought into operative relation to the composing devices while the remaining portion remains in an inoperative position.

4. In a linotype-machine, the combination of a circular magazine, containing upright matrix-channels adapted to receive two or more sets or fonts of matrices and revoluble at the will of the operator around a vertical axis, a fixed curved distributer, overlying a portion only of the magazine-channels, and a fixed composing mechanism underlying said channels, whereby matrices of one set or another may be brought into action.

5. In a linotype-machine, the combination of an overlying magazine, a fixed composing mechanism to which it delivers matrices, and an intermittingly-rotating table, carrying a mold and matrix-clamping devices, arranged to receive the matrices from the composing mechanism.

6. In a linotype-machine, the combination of a composing mechanism for assembling the matrices in line, a table revolving intermittingly thereunder, a mold, matrix-clamping devices and an ejector carried by the table, means for operating the clamp and ejector, a melting-pot provided with metal-ejecting mechanism and arranged to operate with the mold, and means for removing the matrices from the clamping devices subsequent to the casting operation.

7. In a linotype-machine and in combination with a composing mechanism, an intermittingly-rotating table or carrier, provided with a mold, an ejector and matrix-clamping slides, and means for actuating said parts substantially as described.

8. In a linotype-machine, a revolving table, a mold mounted thereon and means for partly ejecting the linotype from the mold, in combination with a rotary cutter, substantially as described, adapted to act on the protruding edge of the linotype as it is advanced by the rotation of the table.

9. In a linotype-machine, in combination with the horizontally and intermittingly rotating table, the mold carried thereby, having inlet-openings on the under side, and the swinging and tilting pot arranged to coöperate therewith.

10. In combination with a circular channeled magazine, an assembling mechanism thereunder, a matrix-clamping, casting and ejecting mechanism revolving thereunder, and matrix elevating and distributing mechanisms, substantially as described and shown.

11. In combination with a circular magazine and a curved distributer thereover, means for lifting a composed line of matrices adjacent to the distributer, and revolving carriers, substantially as described, acting to separate the matrices singly from the end of the composed line and advance them individually along the distributer.

12. In a linotype-machine, a toothed distributer-rail, an elevator arranged to present a line of matrices on a level with the end of the rail, and carriers arranged to separate the matrices and feed them forward singly along the distributer-rail.

13. In a linotype-machine and in combination with an elevator for the matrix-line, a curved distributer-rail and revolving spring-supported arms to urge the matrix-line forward along the rail.

14. In combination with the distributer-rail, yielding arms to force the matrix-line along the rail, an escapement to arrest the line of matrices and release them one at a time, and rotary carriers acting successively to operate the escapement and to advance the released matrix.

15. In a linotype-machine, the combination of a circular magazine, a circular distributer thereover, a revolving frame provided with yielding arms to advance the matrices along the distributer, an elevator to present the matrix-lines to the distributer, and intermediate connections through which the continuously-revolving frame effects the alternate rising and lowering of the elevator.

16. In combination with a toothed distributer-rail to suspend the matrices, carriers to advance the line of matrices along the rail, carriers X having a rotary and a radial motion, a fixed rail $x^5$, to hold said carriers out of engagement with the matrix-line, and an escapement W actuated by the respective carriers X, substantially as described.

17. In a linotype-machine, a horizontally-traveling mold with metal-inlet at the under side, in combination with the swinging and tilting metal-pot mounted to move about two centers and the cams to effect the motions of the pot.

18. In a linotype-machine, the rotary table L, a mold N fixed thereto, slides P, P' and $P^2$ arranged opposite said mold, and stationary cams whereby said slides are actuated to confine and release the matrices substantially as described.

19. In a linotype-machine and in combination with a traveling mold, means for partly ejecting the linotype therefrom, and a trimming device T comprising two rotary cutters to act on opposite sides of the protruding linotype.

20. In a linotype-machine, in combination with means for presenting the matrices successively thereto, the two hinged sustaining-plates H, arranged to engage the ears of the matrices, the pivoted resisting-finger $i$, its supporting-slide, the spring $i^3$ connected to the finger, and the spring $i^4$ tending to resist the advance of the slide.

21. In a linotype-machine, the hinged plates H H, between which the matrices are assembled and sustained, in combination with the traveling mold and the opposing slides, whereby the line of matrices is removed from the assembling-plates H and confined in operative relation to the mold.

22. In a linotype-machine and in combination with a traveling mold and means for partly ejecting the linotype therefrom, a trimming device, fixed in position and adapted to trim the opposite faces of the linotype while it is sustained and carried by the mold.

23. In a linotype-machine, the trimming device, having two opposing cutters, in combination with a traveling mold and means for partly ejecting the slug from the mold, so that its protruding edge will be carried between and acted upon by the two cutters.

24. In a linotype-machine, a mold, having a slot of the dimensions of the required linotype, in combination with means for presenting a line of matrices to and removing them from the open sides of said slot, and a reciprocating ejector-blade mounted permanently in the mold and forming the base of the slot, in opposition to the matrices, whereby said blade is adapted to serve the double purpose of determining the height of the slug and ejecting the same from the mold.

25. In a linotype-machine, the combination of a traveling mold and matrix-clamping slides, mounted in opposition to the mold and arranged to travel therewith.

26. In a linotype-machine, a composing mechanism, a melting-pot and a trimming mechanism, in combination with a revolving table or carrier, carrying a mold and devices for clamping the matrices against the mold, and mechanism for intermittingly revolving said table, whereby the matrices are first received and confined against the mold, the mold thereafter presented to the melting-pot, and finally the mold containing the linotype presented to the trimming devices.

27. In a linotype-machine, the normally-stationary magazine, mounted to be swung around a center of motion, in order to bring one portion or another of said magazine into operative position.

In testimony whereof I hereunto set my hand, this 10th day of July, 1899, in the presence of two attesting witnesses.

FREDRICH C. DAMM.

Witnesses:
W. A. McCALL,
WM. H. GRULER.